July 20, 1926. 1,593,153
A. A. AMBLER
ATTRITION MILL
Filed Jan. 29, 1923 11 Sheets-Sheet 1

Fig. 1.

Inventor-
Arthur A. Ambler.
by his Attorneys
Howson & Howson

July 20, 1926.

A. A. AMBLER 1,593,153

ATTRITION MILL

Filed Jan. 29, 1923    11 Sheets-Sheet 2

Fig.2.

Inventor.-
Arthur A. Ambler.
by his Attorneys.-
Howson & Howson

July 20, 1926.  1,593,153
A. A. AMBLER
ATTRITION MILL
Filed Jan. 29, 1923   11 Sheets-Sheet 3

Fig. 3.

Inventor:-
Arthur A. Ambler
by his Attorneys.-
Howson & Howson

July 20, 1926.  
A. A. AMBLER  
ATTRITION MILL  
Filed Jan. 29, 1923  
1,593,153  
11 Sheets-Sheet 6

A. A. AMBLER

ATTRITION MILL

Filed Jan. 29, 1923    11 Sheets-Sheet 7

Inventor
Arthur A. Ambler
by his Attorneys

July 20, 1926.

A. A. AMBLER 1,593,153

ATTRITION MILL

Filed Jan. 29, 1923    11 Sheets-Sheet. 9

Inventor.
Arthur A. Ambler.
by his Attorneys.
Howson & Howson

July 20, 1926.

A. A. AMBLER 1,593,153

ATTRITION MILL

Filed Jan. 29, 1923

Inventor-
Arthur A. Ambler.
by his Attorneys-
Howson & Howson

Patented July 20, 1926.

1,593,153

UNITED STATES PATENT OFFICE.

ARTHUR A. AMBLER, OF NEW BRUNSWICK, NEW JERSEY, ASSIGNOR TO THE WOLF COMPANY, OF CHAMBERSBURG, PENNSYLVANIA, A CORPORATION OF PENNSYLVANIA.

ATTRITION MILL.

Application filed January 29, 1923. Serial No. 615,556.

This invention relates to machines for reducing, grinding or finely dividing material such as grain, corn cobs, or cassava root, by cutting, rubbing, or attrition, and one object of said invention is to provide such a machine with horizontal grinding discs of novel form and mounting, including convenient and relatively simple means whereby the distance between them may be conveniently adjusted.

Another object of the invention is to provide an upright attrition mill including an enclosing shell or casing particularly designed to serve as a safety device to prevent damage in case of breakage of the discs; it being also desired that the casing shall include a cover so mounted as to be easily and quickly removable to permit access to the grinding discs and their associated parts.

A further object of my invention is to provide a grinding disc for an attrition mill which shall include grinding plates of such construction that they shall tend to remain in place or more firmly seat themselves under operating conditions, the invention also contemplating novel means for removably retaining the grinding plates in position upon the discs.

It is also desired to provide a relatively simple device for collecting and discharging the ground or finely divided material produced by the grinding discs.

A further object of my invention is to provide self-contained and relatively simple means for driving one of the grinding discs of an attrition mill, together with means for reversing the direction of rotation of said disc when this is desirable, the invention contemplating a novel combination of friction rollers and driving disc as well as conveniently operative means for adjusting the relative positions of these elements to compensate for wear.

These objects and other advantageous ends I attain as hereinafter set forth, reference being had to the accompanying drawings, in which.

In the above drawings, 1 represents a hollow base plate of generally rectangular outline having at its opposite sides two outer vertically extending standards or frame members 2 and 3 and two inner standards 68 and 68ª. These support the casing structure 4 of my attrition mill, which is made up of bottom and top plates 5 and 6 of approximately circular outline and an intermediate cylindrical shell or body 7. The top plate 6 is hinged by bolts 8 to lugs 9 bolted or otherwise rigidly mounted on the top of the standard or frame member 3 so that this plate which serves as a cover, may be swung through an angle of substantially 180° to permit of free access to the interior of the casing. This cover is ordinarily held in place by bolts 101.

The shell or body 7 is preferably made of relatively heavy wrought steel so that it not only serves as an enclosing member but also constitutes a safety ring to confine and therefore prevent damage from, the grinding discs hereafter described, in case these should break under operating conditions. The body 7 is preferably imperforate throughout, and it is not permanently attached to any other parts of the mill.

Figure 5:
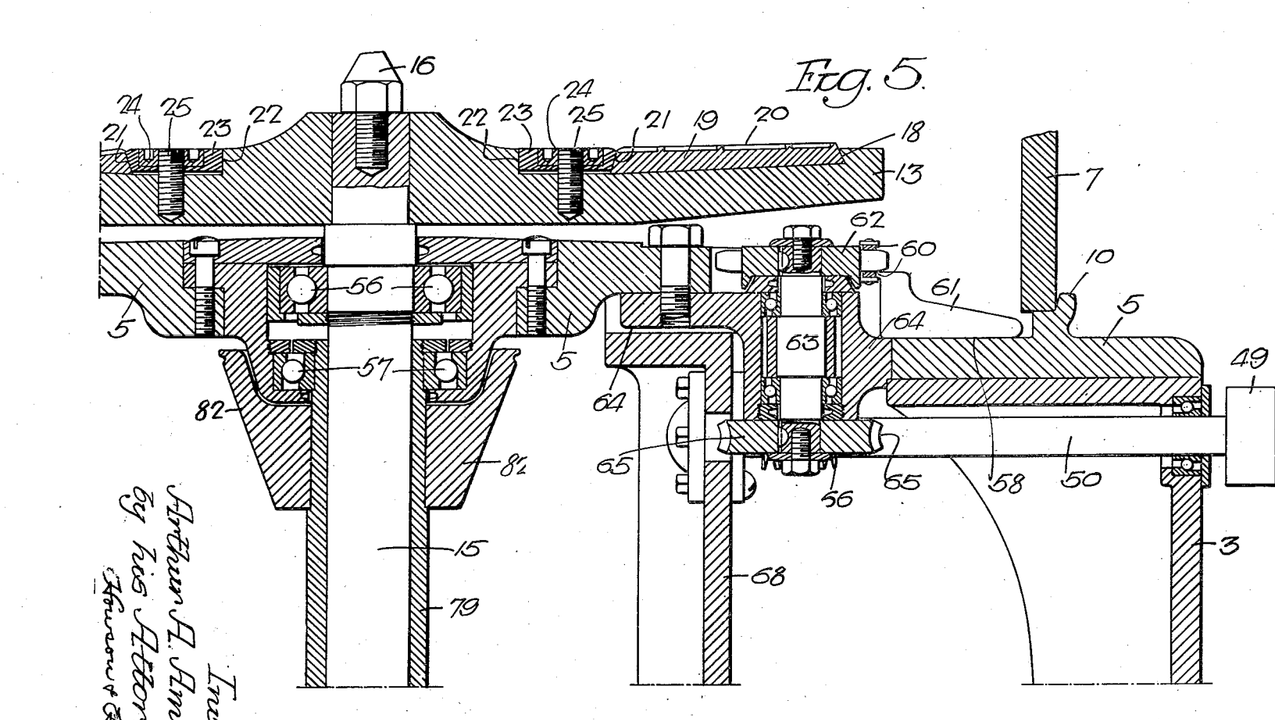

As shown in Fig. 5, the body 7 fits into and is prevented from lateral displacement by a flange 10 on the bottom plate 5, while the top or cover plate 6 is likewise provided with a flange 11 into which the body 7 fits, thus serving to prevent relative horizontal movement between the parts. As already stated, the hinged support for the top plate is independent of the body 7; and the bolts 101 serve to connect the top plate with the bottom plate independently of the body 7.

Within the casing thus formed are mounted two generally parallel, horizontally placed grinding discs 12 and 13, of which the first is formed as an annular structure having a central circular opening 14 coaxial with a centrally placed opening in the top plate 6. The lower disc 13 is rigidly mounted on the upper end of a vertical driving shaft 15 and its central portion is upwardly extended in a generally conical form into the opening 14, there being a conical deflecting member 16 mounted on the upper end of the driving shaft and projecting coaxially into the opening in the cover 6.

It is to be noted that in accordance with my invention, the adjacent faces of the two grinding discs 12 and 13 are formed with coaxial annular recesses of flattened conical form decreasing in depth from their inner portions outwardly. The outer sides of these recesses are undercut as indicated at 17 and 18, Fig. 4, for the reception of annular series of segmental grinding plates 19, whose exposed or operative faces are formed with radially elongated, generally rectangular cavities or depressions forming or defining radially extending, sharp edged ribs 20. The outer edges of the various grinding plates are dove-tailed in order to coact with the undercut sides 17 and 18 of the recesses in which they are mounted, and their thickness increases from said outer edges inwardly to their inner edges, which are also inclined or dove-tailed as indicated at 21.

The radial lengths of the grinding plates are substantially equal, so that their edges 21 coact with the inner side 22 of the recess in the disc in which they are mounted to define an annular space in which is mounted an annular retaining ring 23. The outer edge or side of this ring is undercut to suitably cooperate with the dove-tailed inner sides or edges of the grinding plates and said ring is held in place by a series of circular countersunk nuts 24 threaded on studs 25 suitably mounted in the body of the grinding disc. It is noted that the retaining ring 23 is formed or provided with a number of kerfs or elongated slots 26 extending inwardly from its outer edge to within a short distance of its inner edge and each of the slots is preferably positioned about midway between two adjacent nuts 24.

The grinding plates 19 are preferably of such angular dimensions that the inner ends of each adjacent two of them are engaged by the retaining ring between each pair of adjacent slots 26, which are provided in order to permit said ring to warp or otherwise accommodate itself to engage and rigidly clamp the different plates even though these may vary slightly in length. The distance between the adjacent faces of the two grinding discs may be uniform, in the present case it is a maximum at the center, from which it decreases to a minimum toward the outer portions of the discs. While this arrangement may be secured by any suitable arrangements of parts, in the present instance it is due to the conical shape of the plate-holding recesses in the grinding discs as well as to the varying thickness of said grinding plates.

The disc 12 is hung from and rigidly supported by the top or cover plate 6 by a series of studs 27 threaded into the body of the disc and extending through holes in bosses formed in the cover plate. Each of said bosses has threaded therein an adjusting sleeve 28 and each stud has threaded on its upper end a nut 29 resting on such sleeve. Concentrically with each of the studs 27 the disc 12 is formed with circular bosses 30 extending into correspondingly formed recesses in the under side of the cover plate 6, the sleeves 28 extending through said plate and engaging the preferably concave upper faces of said bosses 30.

With this arrangement of parts, the sleeves 28 may be accurately adjusted to the same relative positions in the cover 6, after which by setting up on the nuts 29, the upper grinding disc 12 may be drawn upwardly until its bosses 30 engage said sleeves, thus making it possible to accurately set said disc to make distance between it and the lower disc uniform at all points.

Figure 9:
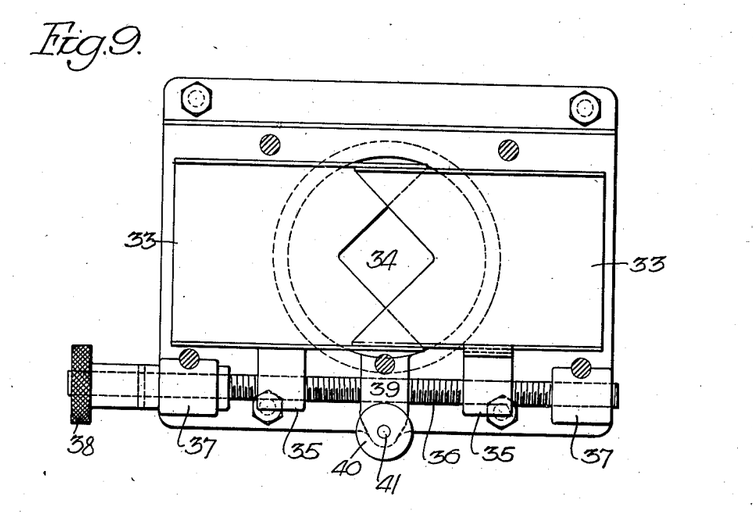
Fig. 9 is a plan, partly in horizontal section, of the lower portion of the feed hopper of my mill.
Figure 10:
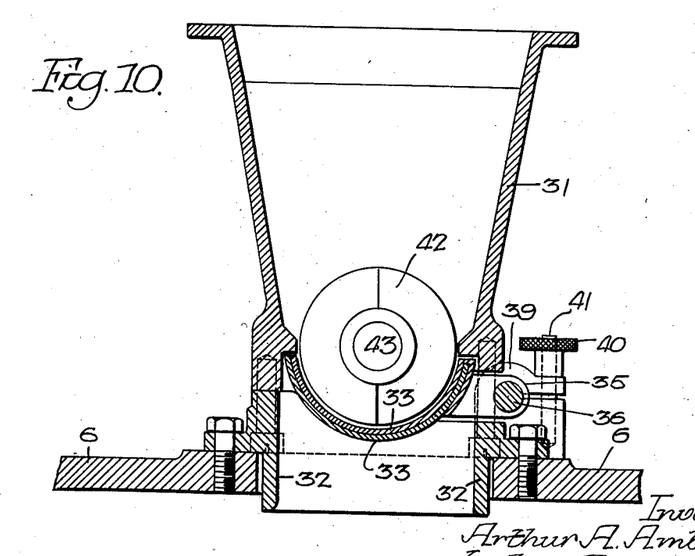
Fig. 10 is a vertical section on the line 10—10, Fig. 4, illustrating the construction of the feed hopper.
Figure 11:
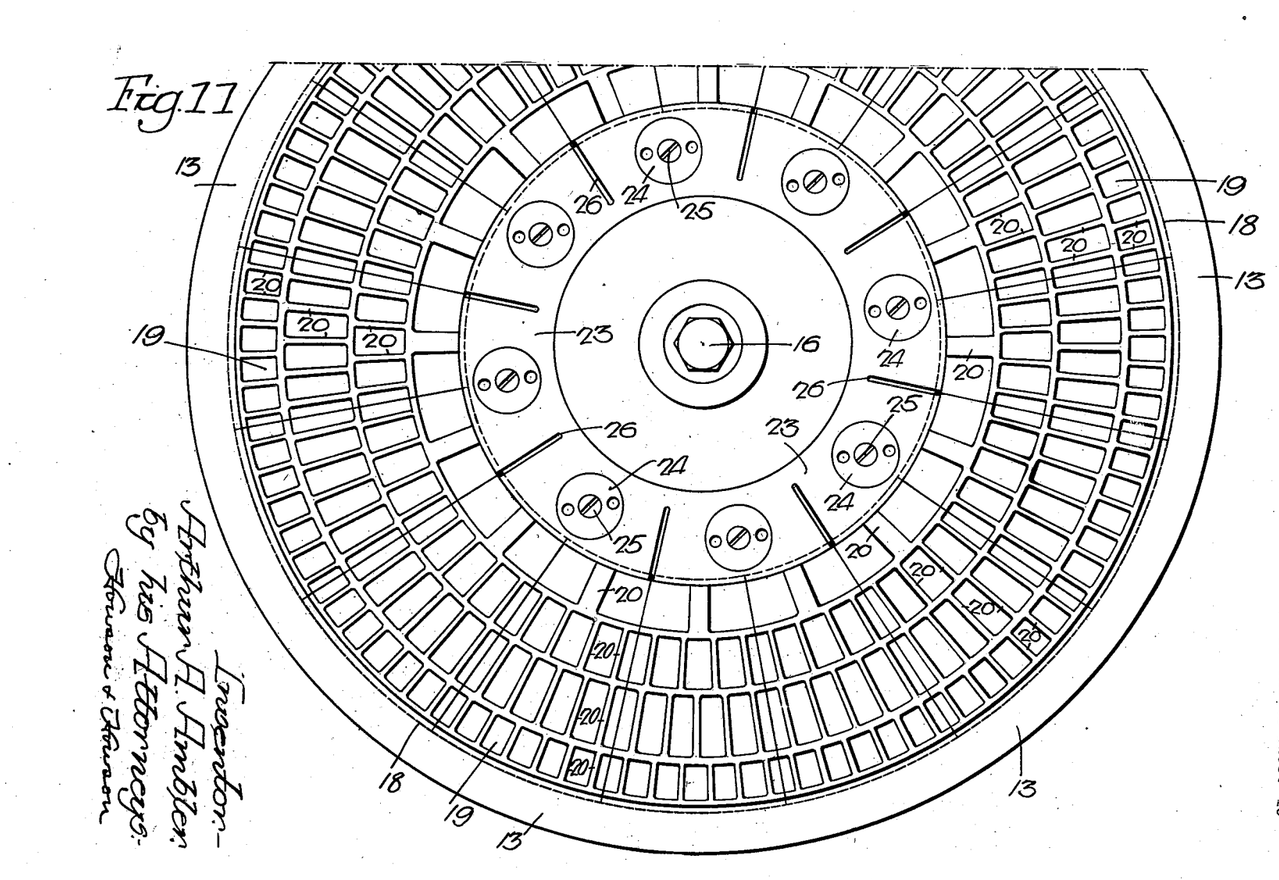
Fig. 11 is a plan of one of the grinding discs.
Figure 12:
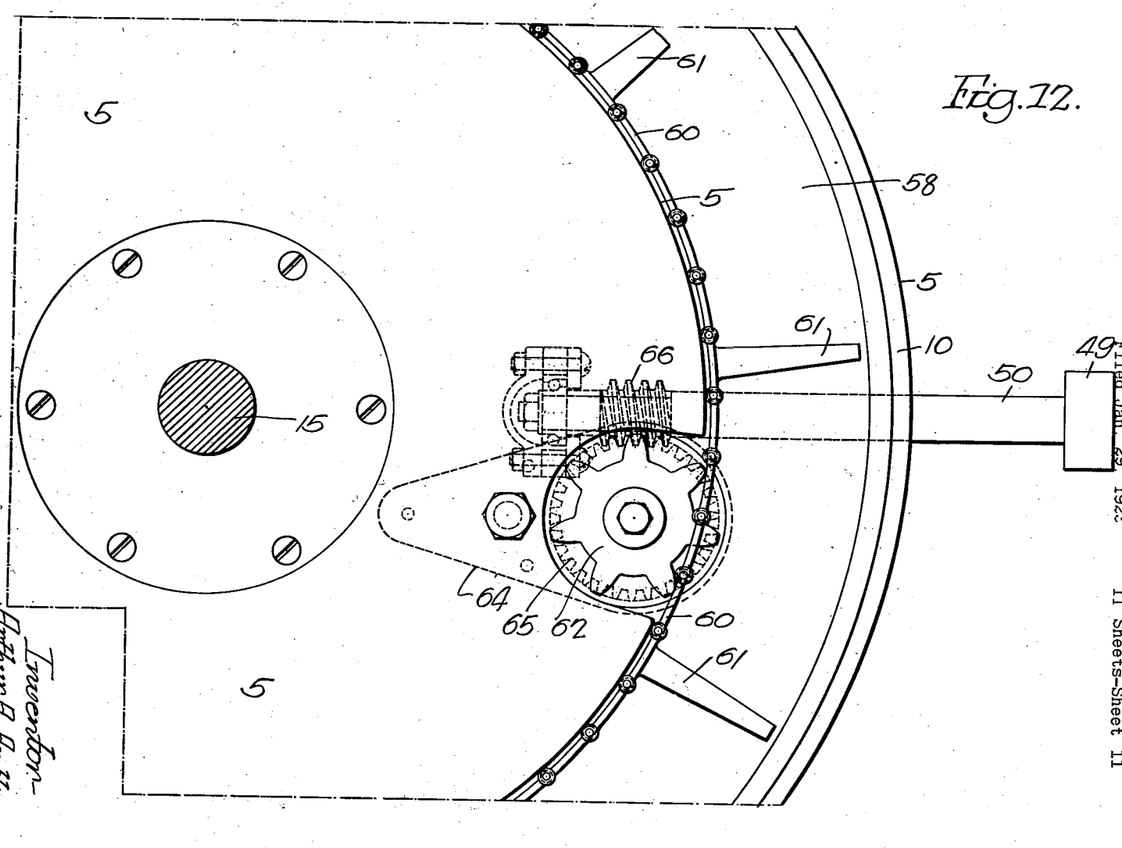
Fig. 12 is a fragmentary plan of the bottom of the interior of the casing of my attrition mill, showing the vertical driving shaft in section.

For delivering material to the grinding discs, I provide a hopper 31 having a downwardly flanged outlet 32 in its bottom fitting into the central opening in the top plate 6 of the casing. As shown in Figs. 9 and 10, the passage of material from the hopper is controlled by a pair of slidably mounted, semi-cylindrically curved valve members 33—33 designed to slide one within the other and having their adjacent ends formed with V-shaped recesses. The sides of said recesses are preferably at angles of substantially 90° so that they define a substantially rectangular opening 34, whose area may be varied from zero to a maximum by moving said valve members apart. For the purpose of adjusting said members, each of them is provided with a laterally projecting lug 35 and the two lugs are formed with aligned holes threaded to receive a right- and-left-hand screw 36 carried in bearings 37—37. On one end of this screw is fixed a milled head or handle 38 whereby it may be turned to cause the valve members 33 to approach or recede from each other and said screw may be immovably held in any given position by a clamping member 39 controlled by a nut 40 operative on a threaded spindle 41 projecting through said member.

Figure 4:
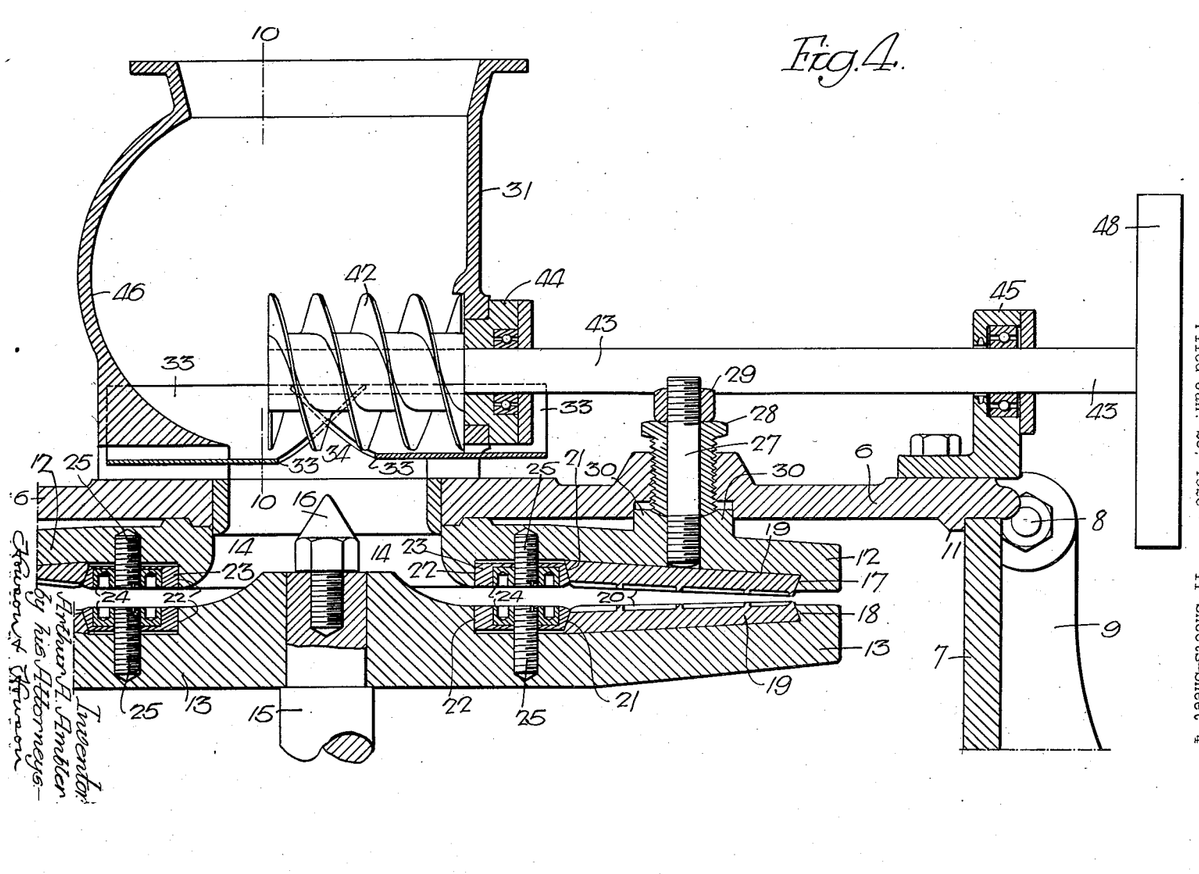
Figs. 4, 5 and 7 are fragmentary vertical sections, taken through the vertical driving shaft of the mill, illustrating the detail construction of certain of its parts.

Rotatably mounted within the bottom of the hopper and substantially coaxial with the two curved valve members 33 is a feeder or helical conveyor 42 mounted on a shaft 43 carried in bearings 44 and 45 respectively provided in the side of the hopper and on the cover plate 6. Said conveyor is formed to collect and move material from one side of the hopper toward the opening 34 defined by the adjacent edges of the valve members 33, and as shown in Fig. 4, that side 46 of the hopper 31 adjacent the free end of the conveyor 42 is curved upwardly and over. As a result material propelled by said conveyor and failing to pass through the opening 34, will be forced against said curved side and be directed upwardly so that it is ultimately caused to fall over onto the conveyor. If therefore the material delivered to the hopper fails to pass out of the opening in the bottom thereof, it is merely circulated by the conveyor without packing or causing damage.

The shaft 43 has fixed to its outer end adjacent the side of the casing 4, a driving pulley 48 connected by a belt 47 with a pulley 49 on a shaft 50 which in turn is connected through a pulley 51, a belt 52 and a pulley 53 to a main driving shaft 54. The latter is journaled in suitable bearings, hereafter described, and has a driving pulley 55 actuated from any suitable source of power.

As shown in Fig. 5, the upper end of the vertical shaft 15 is journaled in bearings 56, suitably mounted at the center of the bottom plate 5 which under the lower grinding disc 13 is preferably raised to provide an annular trough or depressed portion 58 immediately adjacent the bottom of the casing body 7, wherein falls the material passing out from between the two grinding discs. At a suitable point in this collecting trough or depression is an outlet opening 59 (Fig. 3) for the discharge of ground material, and in order to deliver to this opening the material entering the trough, I provide an endless conveyor comprising a chain 60 having thereon a series of flights or plates 61 projecting into and engaging the bottom of the trough 58 in planes substantially radial thereto. Said chain is supported by a suitable annular shoulder formed on the bottom plate 5 concentrically with the driving shaft 15.

The chain 60 is actuated to cause the plates 61 to move through the trough and deliver the material therein to the outlet 59, by means of a sprocket wheel 62 (Fig. 5) mounted on a short vertical spindle 63 preferably carried in bearings in a supporting frame 64 removably inserted in a suitable opening in the bottom plate 5. The lower end of this shaft has fixed to it a worm wheel 65 engaged by a worm 66 on the shaft 50, which is actuated from the main driving shaft as previously described. Said shaft 50 is carried in suitable bearings provided in the standards or frame structures 3 and 68.

Figure 3:
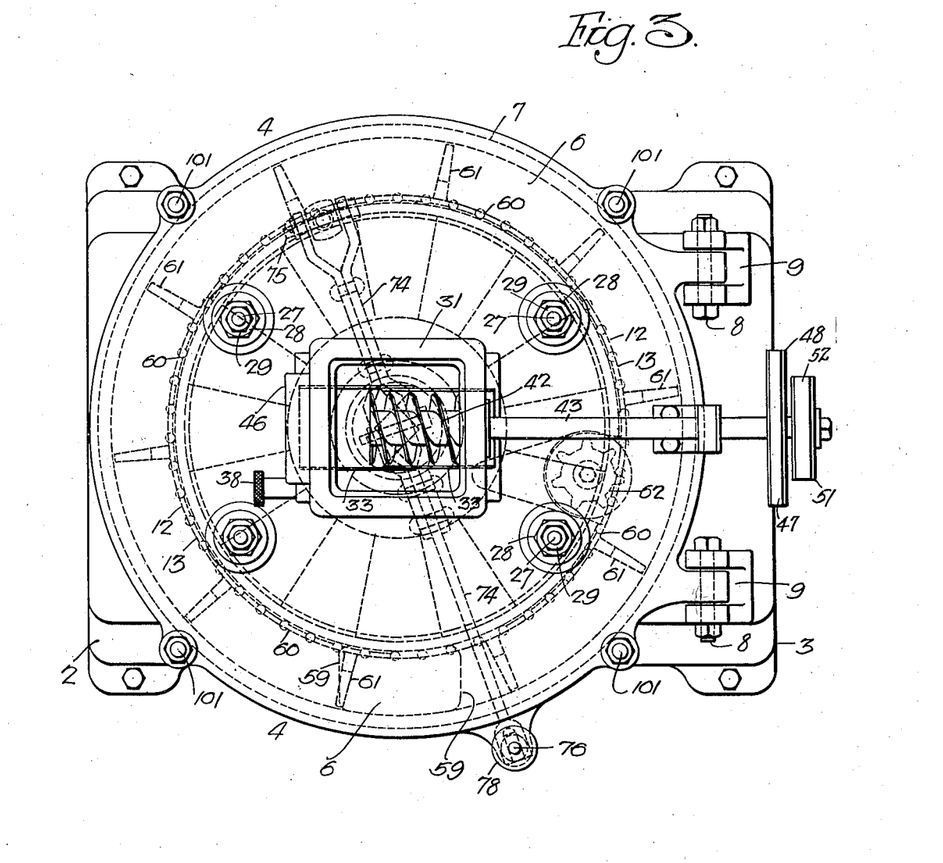
Fig. 3 is a plan of a mill shown in Figs. 1 and 2.
Figure 7:
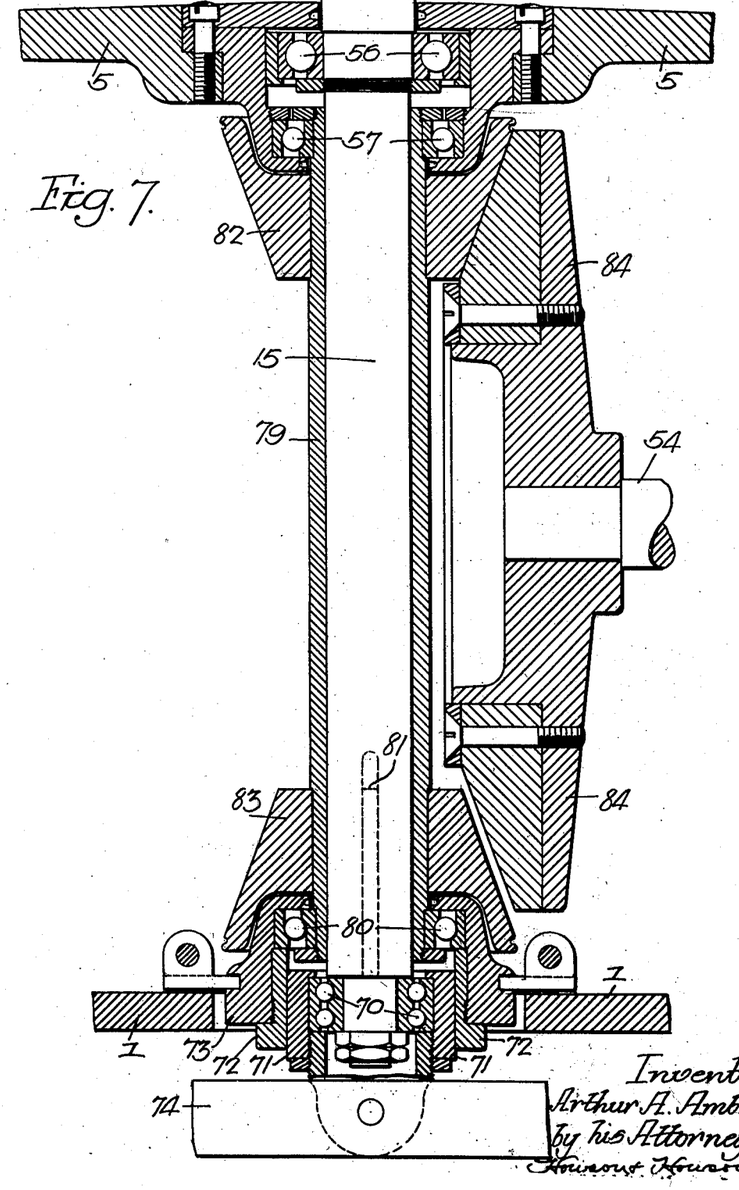

The lower end of the driving shaft 15 is supported in a bearing 70 mounted in a sleeve 71 vertically slidable in a bushing 72 threaded into a suitable supporting member 73 carried in a central opening of the base plate 1. As indicated in Figs. 3 and 7, the slidable sleeve 71 and with it the bearing 70 are supported by a substantially horizontal lever 74 fulcrumed at one end by a bolt or pin 75 to a suitable lug on the under side of the base plate 1 and at its opposite end pivotally connected to the lower end of a vertically extending rod or link 76 which projects upwardly through a lug forming part of and projecting from the bottom plate 5 of the casing. The upper end of this link or rod is threaded for the reception of adjusting nuts 77 and 78 engaging it on opposite sides of said plate 5. By suitably rotating the nut 78, the lever 74 may be turned on its fulcrum bolt to raise or lower the shaft 15 and thus cause the lower disc 13 to approach or recede from the upper disc at will.

For driving the vertical shaft 15, I mount on it a sleeve 79 whose lower end is supported in a bearing 80 carried by the member 73 and whose upper end is supported in a bearing 57 carried by the bottom plate 5 of the casing. This sleeve is operatively connected to the shaft 15 by a key or spline 81 so as to permit of the above described vertical adjustment of said shaft and the sleeve at its opposite ends has fixed to it a pair of conical, oppositely disposed friction rollers 82 and 83, either of which is designed to be operatively engaged by a bevelled driving disc 84 fixed to the free end of the driving shaft 54.

Figure 6:
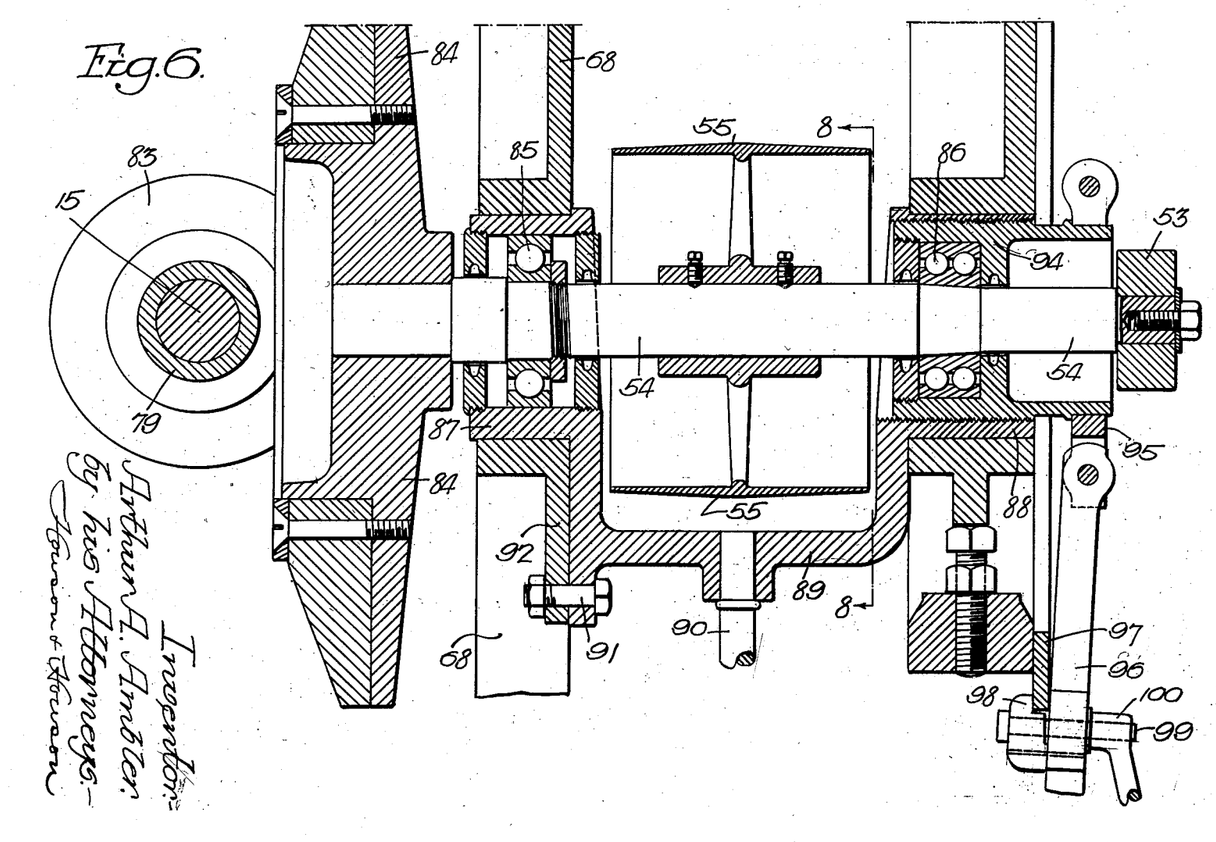
Fig. 6 is a horizontal section on the line 6—6, Fig. 1.
Figure 8:
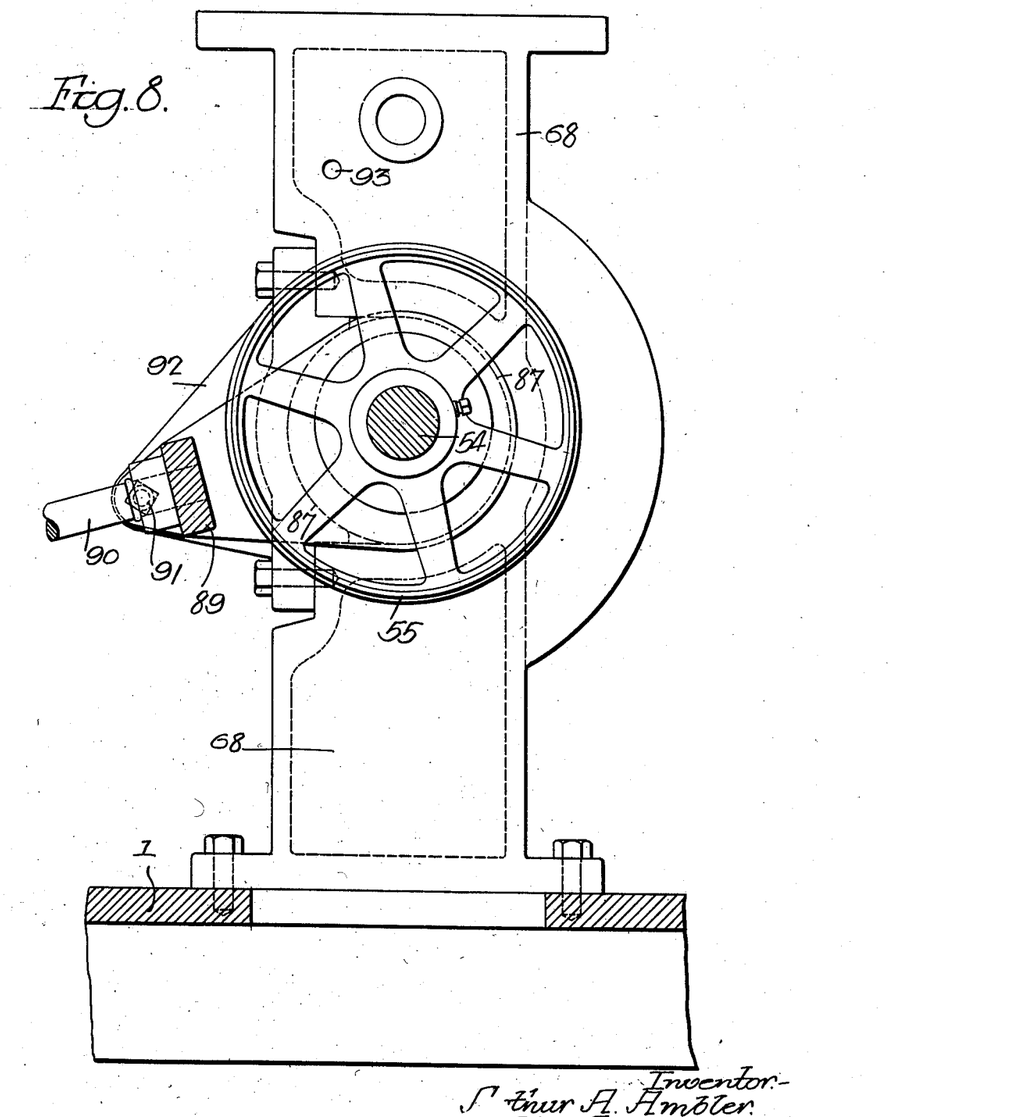
Fig. 8 is a vertical section on the line 8—8, Fig. 6.

In order to adjust said shaft 54 to cause the disc 84 to operatively engage and therefore transmit power to either of the friction rollers 82 or 83 at will, said shaft is mounted in bearings 85 and 86 carried respectively in eccentric sleeves 87 and 88 operatively connected by a yoke 89. Said sleeves are rotatably mounted respectively in the standards 68 and 3 and the yoke is provided with an outwardly projecting handle 90 whereby its position may be adjusted through an angle of substantially 90° so as to shift the friction disc 84 from engagement with the roller 82 into engagement with the roller 83 or vice versa. For retaining the yoke in either of these extreme positions I provide a bolt 91 (Figs. 6 and 8)

which may be placed either in a suitable hole formed in an arm 92 projecting from the standard 68 or in a hole 93 of the latter.

In order to compensate for wear between the rollers 82—83 and the coacting face of the driving disc 84, the shaft 54 on which this latter is mounted is so supported as to be longitudinally adjustable. For this purpose the bearing 85 is slidably mounted in the sleeve 87, while the bearing 86 is carried by a sleeve 94 threaded into the eccentric sleeve 88. Said sleeve 94 projects beyond the outer face of the standard 3 and has clamped to it a split ring 95 to which is pivoted a radially projecting arm or operating handle 96. The latter is movable over the face of a quadrant 97 fixed to the standard or frame member 3, substantially concentric with the shaft 54 and said arm 96 may be rigidly clamped to said quadrant in any given position by a block 98 carried on a bolt 99 passing through said arm 96; there being a clamping handle 100 threaded to the outer end of said bolt. By turning this handle, the block 98 may be caused to immovably grip the operating arm 96 to the segment 97.

Figure 1:
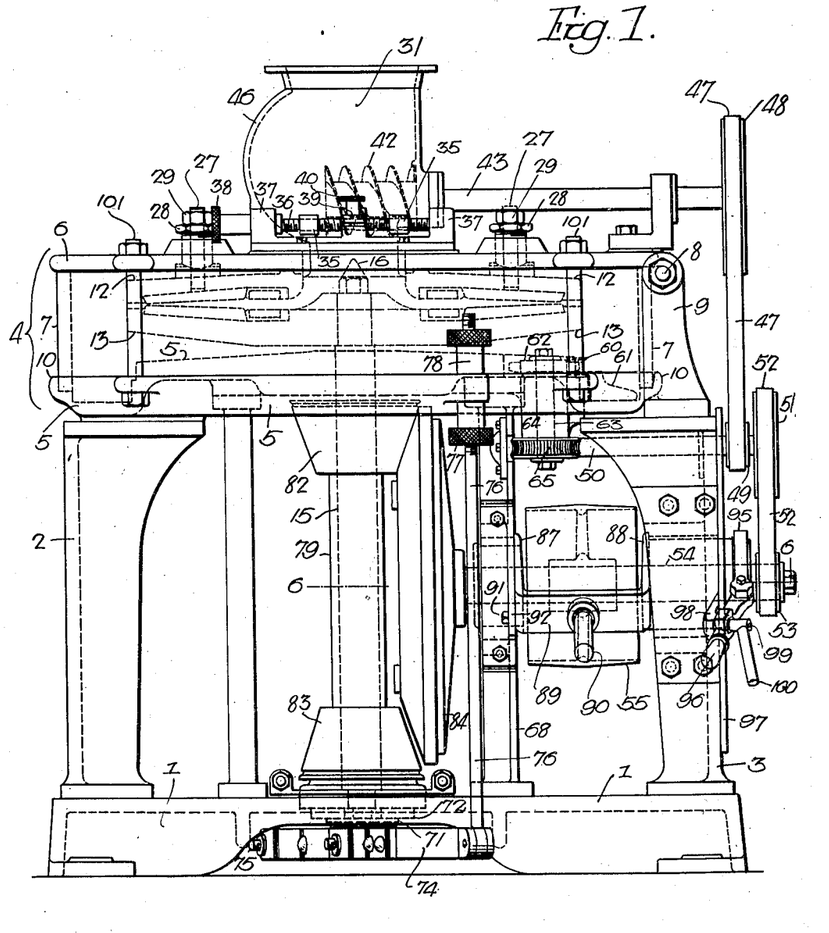
Figs. 1 and 2 are respectively side and end elevations of an attrition mill constructed in accordance with my invention.
Figure 2:
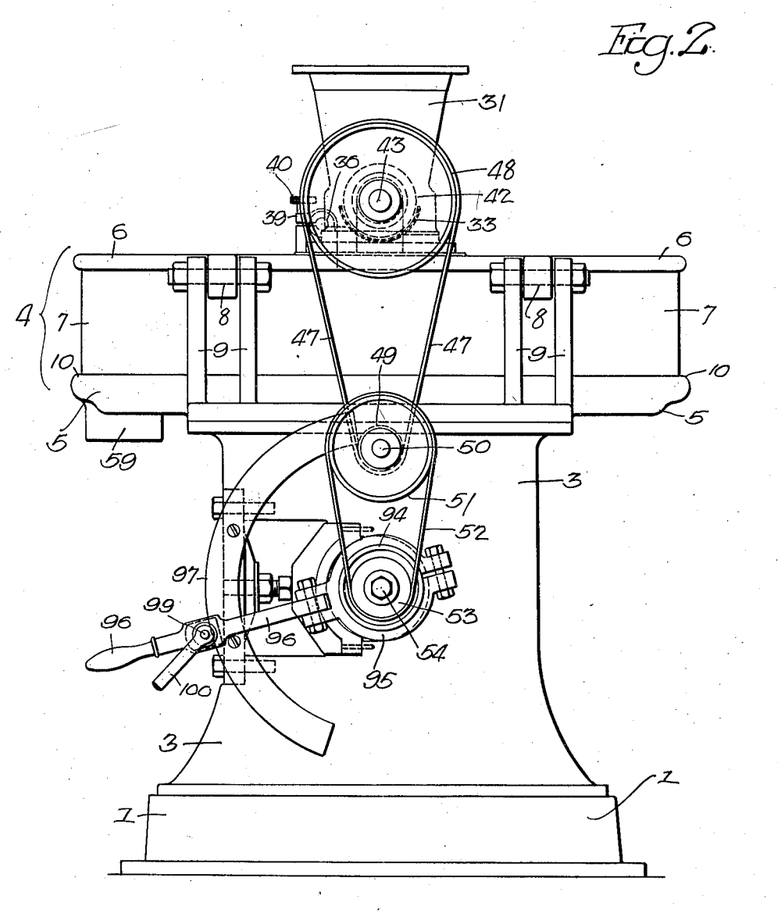

With the above described arrangement of parts, the main driving shaft 54 is turned at a suitable speed by power applied to the pulley 55, and with the parts in the positions shown in Fig. 1, the driving disc 84 engages the conical roller 82, which through the sleeve 79 turns the grinding disc 13 at a relatively high rate of speed. At the same time power is transmitted from the shaft 54 through the shaft 50 and thence to the shaft 43 which turns the conveyor 42 in such a direction as to feed material from the right hand side of the hopper 31 toward the outlet 34 thereof.

By means of the adjusting nut 38 the two valve members 33—33 may be so moved as to give the outlet opening 34 the size desired to permit of the delivery of the grain or other substance to be ground from the hopper at the desired rate. From the opening 34 and the central opening 14 of the grinding disc 12 said material is distributed with approximate uniformity by the conical end 16 on the shaft 15 to all parts of the annular space between the two discs and owing to the high speed of rotation of the disc 12, it is thrown outwardly by centrifugal force, being acted on by the relatively sharp edges of the ribs 20 of the two sets of grinding plates, so that it is quickly reduced to a finely divided condition. In this form it is thrown out from between the grinding discs against the body 7 of the casing, from which it falls into the trough 58, where it is engaged by the plates 61 on the chain 60 and moved thereby to the outlet 59, through which it is discharged into any suitable conveyor or receptacle. As previously described, the chain 60 is driven by power from the main shaft 54 through the pulley 53, belt 52, pulley 51, shaft 50, worm 66, worm wheel 65, shaft 63 and sprocket 62.

The above described operation may be continued until the active edges of the ribs 20 become more or less dulled, when the direction of rotation of the disc 13 can be quickly and conveniently reversed by removing the bolt 91 and by means of the handle 90, swinging the yoke 89 upwardly through an angle of substantially 90°, thus moving the shaft 54 bodily to such an extent as to disengage the driving disc 84 from the roller 82. Thereafter it is caused to frictionally engage the roller 83 and said yoke is retained in its new position by inserting the bolt 91 in the upper hole 93.

Any wear of the coacting friction rollers and disc may be compensated for by suittable adjustment of the arm 96 and the distance between the fixed and movable discs may be varied to change the degree of fineness of the finished product by adjusting the shaft 15 through the lever 74 as above described.

It is particularly to be noted that with the discs mounted and constructed as above described, the centrifugal force tending to throw the grinding plates 19 outwardly is effectually resisted by the undercut sides of the recess in the disc 13. At the same time, since the bottom of said recess is of conical form and therefore inclined at an acute angle to a plane at right angles to the axis of the shaft 15, there is a definite component of the centrifugal force operative to press the grinding plates 19 toward the body of the rotary disc in which they are mounted. As a result, the construction tends to prevent loosening of the grinding plates, although in the event of their becoming loose or breaking, the relatively heavy side or body 7 of the casing effectually confines them in such manner as to prevent their damaging external objects.

When it is desired to inspect the grinding plates or to replace them, this may be quickly and conveniently accomplished by removing the nuts from the bolts 101 whereby the cover plate 6 is held in place and thereafter swinging said plate on its hinges, together with the hopper mounted upon it, through an angle of 180°,—the shaft 43 with its pulley 48 being first removed, if desired. The grinding faces of the two discs are thus completely exposed so that the plates 19 may be removed and replaced by others and the interior of the mill inspected.

As previously noted, if the material delivered to the hopper fails to feed through the outlet opening 34, it is merely circulated in said hopper by the conveyor 42. It is further to be noted that my attrition mill, being of the upright type, possesses material advantages over mills of the horizontal type, owing to the proximity of the feeding conveyor to the space between the discs where the grinding begins. When the grain leaves the conveyor the force of gravity is aided by the suction due to the operation of the lower grinding disc so that it flows freely to the grinding space.

I claim:

1. The combination of a casing consisting of a substantially cylindrical body, a top member and a bottom member; two grinding discs mounted in the casing between the end planes of the cylindrical body, means for rotating one of the said grinding discs; and means for supporting the other grinding disc from the top member of the casing independently of the body, the said means being adjustable to permit the changing of the position of the said disc relatively to the top member and relatively to the rotary disc.

2. The combination of a supporting structure; a casing mounted thereon and including a bottom member, a substantially cylindrical body on the bottom member and a top member for the body pivotally mounted on the supporting structure independently of said body; two grinding discs in the casing; and means for rotating one of said grinding discs.

3. The combination of a supporting structure; a casing mounted thereon and including a bottom member, a substantially cylindrical body on the bottom member and a top member for the body pivotally mounted on the supporting structure independently of said body; two grinding discs in the casing; means for rotating one of said grinding discs; and means for suspending the other grinding disc from the top member of the casing.

4. The combination in an attrition mill of two coacting grinding discs, of which at least one is rotary; a bottom plate below the lower disc having an annular seat with retaining means adjacent thereto; an approximately cylindrical body resting on the said seat and held against horizontal movement by the retaining means, the said body surrounding the discs; a top plate resting on the body and having retaining means engaging the body to prevent horizontal movement; and a pivotal mounting for the top plate supported independently of the body.

5. The combination in a grinding disc of a body having an annular recess; segmental grinding plates occupying a portion of said recess; and an annular retaining ring mounted in the remainder of the recess for holding said plates in position, said ring being formed with radial slots to permit of its parts adapting themselves to the several grinding plates.

6. A grinding disc consisting of a body having an annular recess formed with an undercut outer side; segmental grinding plates mounted in said recess having their inner and outer sides bevelled and their outer sides coacting with the undercut side of the recess; a flexible retaining ring also mounted in the recess and undercut to coact with the inner bevelled ends of the grinding plates; with means for removably holding said ring in place.

7. A grinding disc consisting of a body having an annular recess formed with an undercut outer side; segmental grinding plates mounted in said recess having their inner and outer sides bevelled and their outer sides coacting with the undercut side of the recess; a flexible retaining ring also mounted in the recess and undercut to coact with the inner bevelled ends of the grinding plates; with means for removably holding said ring in place consisting of studs set in the body of the disc and nuts on the studs countersunk into said ring.

8. The combination of a casing having parallel top and bottom members and a body portion between said members; a rotary grinding disc in the casing; a relatively fixed grinding disc also mounted in the casing; adjustable sleeves extending through the top member of the casing; bolts mounted in the fixed grinding disc and extending through said sleeves; with nuts on said bolts for holding the disc against the inner ends of the sleeves.

9. The combination of a casing having parallel top and bottom members and a body portion between said members; a rotary grinding disc in the casing; a relatively fixed grinding disc also mounted in the casing; adjustable sleeves extending through the top member of the casing; bolts mounted in the fixed grinding disc and extending through said sleeves; with nuts on said bolts for holding the disc against the inner ends of the sleeves, there being bosses on said fixed disc coaxial with said bolts extending into recesses in the top casing member.

10. The combination of a casing; coacting grinding discs in said casing; a shaft for driving one of the discs; a conveyor movable coaxially with the grinding discs for collecting material reduced thereby and delivering it to an outlet opening; and means supplemental to the shaft for driving the conveyor.

11. The combination of a casing; coacting grinding discs in said casing; a conveyor movable coaxially with the grinding discs for collecting material reduced thereby and delivering it to an outlet opening; and means for operating the conveyor at a speed slower than that of the rotating disc.

12. The combination of a casing; coacting grinding discs in said casing; and a chain conveyor operative coaxially with the grinding discs for collecting material reduced thereby and delivering it to an outlet opening.

13. The combination of a casing; coacting grinding discs in said casing; and a chain conveyor operative coaxially with the grinding discs for collecting material reduced thereby and delivering it to an outlet opening, the said conveyor having radially projecting flights.

14. The combination of coacting grinding discs; an enclosing casing for said grinding discs having an annular trough provided with an outlet opening; the said trough being located at a level below the main bottom plane of the interior of the casing; a chain conveyor substantially coaxial with the grinding disks and having flights extending into said trough; and means for driving said conveyor to collect material reduced by the grinding discs and deliver it to the outlet opening.

15. The combination of coacting grinding discs; an enclosing casing for said grinding discs having an annular trough below the main plane of the bottom of the interior of the casing and provided with an outlet opening; a chain conveyor substantially coaxial with the grinding discs and having flights extending into said trough; an annular guide means on the casing for the conveyor chain; and means for driving said conveyor to collect material reduced by the grinding discs and deliver it to the outlet opening.

16. The combination of coacting grinding discs; an enclosing casing for said grinding discs having an annular trough below the main plane of the bottom of the interior of the casing and provided with an outlet opening; a chain conveyor substantially coaxial with the grinding discs and having flights extending into said trough; an annular guide means on the casing for the conveyor chain; and a sprocket wheel located within the said annular guide means for driving the chain of the conveyor to collect material reduced by the grinding discs and deliver it to the outlet opening.

ARTHUR A. AMBLER.